United States Patent
Dai et al.

(10) Patent No.: US 11,459,487 B2
(45) Date of Patent: Oct. 4, 2022

(54) GUMMED PAPER

(71) Applicant: NINGDE AMPEREX TECHNOLOGY LIMITED, Ningde (CN)

(72) Inventors: Zhifang Dai, Ningde (CN); Luran Zhang, Ningde (CN); Hai Long, Ningde (CN); Xinghua Tao, Ningde (CN)

(73) Assignee: NINGDE AMPEREX TECHNOLOGY LIMITED, Fujian (CN)

(*) Notice: Subject to any disclaimer, the term of this patent is extended or adjusted under 35 U.S.C. 154(b) by 294 days.

(21) Appl. No.: 16/197,207

(22) Filed: Nov. 20, 2018

(65) Prior Publication Data
US 2019/0153265 A1   May 23, 2019

(30) Foreign Application Priority Data
Nov. 23, 2017   (CN) .......................... 201721583288.5

(51) Int. Cl.
*C09J 7/21*   (2018.01)
*C09J 7/35*   (2018.01)
*C09J 7/29*   (2018.01)

(52) U.S. Cl.
CPC . *C09J 7/21* (2018.01); *C09J 7/29* (2018.01); *C09J 7/35* (2018.01); *B32B 2405/00* (2013.01); *C09J 2301/408* (2020.08); *C09J 2433/00* (2013.01)

(58) Field of Classification Search
CPC ............ C09J 7/21; C09J 7/35; B32B 2405/00
See application file for complete search history.

(56) References Cited

U.S. PATENT DOCUMENTS

| | | | |
|---|---|---|---|
| 5,104,765 A * | 4/1992 | Chowdry | G03G 15/1695 430/125.6 |
| 6,322,876 B1 * | 11/2001 | Lythgoe | B41M 3/12 427/149 |
| 6,376,038 B1 * | 4/2002 | Schutz | B42C 9/0062 428/40.1 |
| 2007/0054469 A1 * | 3/2007 | Yano | C09J 7/29 438/459 |
| 2010/0028602 A1 * | 2/2010 | Naritomi | B32B 5/147 428/147 |
| 2013/0330546 A1 * | 12/2013 | Takami | C09J 7/22 428/354 |
| 2015/0361311 A1 * | 12/2015 | Combs | B32B 23/044 428/535 |

* cited by examiner

*Primary Examiner* — Tong Guo
(74) *Attorney, Agent, or Firm* — Morgan, Lewis & Bockius LLP (57) ABSTRACT

A gummed paper comprises a first substrate having an uncovered region on an upper surface thereof; and a second substrate, in which in a thickness direction, a projection of the second substrate partially covers a projection of the first substrate, a dyne value of an upper surface of the second substrate is greater than or equal to 40 dyn/cm, and a dyne value of the uncovered region is less than the dyne value of the upper surface of the second substrate.

16 Claims, 5 Drawing Sheets

GUMMED PAPER

CROSS-REFERENCE TO RELATED APPLICATION

This application claims priority to and benefits of Chinese Application No. 201721583288.5, filed on Nov. 23, 2017, the entire content of which is incorporated herein by reference.

TECHNICAL FIELD

The present disclosure relates to the field of gummed papers, and more particularly to a gummed paper.

BACKGROUND

In the coating process, a groove is often required at a certain position of a diaphragm. For this, a laser washing technology is often applied, however, the parameters of the laser washing process are difficult to control, and the yield is low.

SUMMARY

In embodiments of the present disclosure, there is provided a gummed paper, including: a first substrate, having an uncovered region on an upper surface thereof; and a second substrate, in which in a thickness direction of the gummed paper, a projection of the second substrate partially covers a projection of the first substrate, a dyne value of an upper surface of the second substrate is greater than or equal to 40 dyn/cm, and a dyne value of the uncovered region is less than the dyne value of the upper surface of the second substrate.

In embodiments of the present disclosure, the gummed paper further includes: a first adhesive layer, adhered to a lower surface of the first substrate; a second adhesive layer, located between the first substrate and the second substrate and configured to connect the first substrate with the second substrate.

In embodiments of the present disclosure, in a width direction of the gummed paper, an edge of the second substrate is within an edge of the first substrate corresponding to the edge of the second substrate, an edge of the second adhesive layer is within an edge of the first substrate corresponding to the edge of the second adhesive layer; and in a length direction of the gummed paper, an edge of at least one side of the second substrate is within an edge of the first substrate corresponding to the edge of at least one side of the second substrate, an edge of at least one side of the second adhesive layer is within an edge of the first substrate corresponding to the edge of at least one side of the second adhesive layer.

In embodiments of the present disclosure, the dyne value of the uncovered region of the upper surface of the first substrate is less than 40 dyn/cm.

In embodiments of the present disclosure, the uncovered region of the upper surface of the first substrate is fluorinated, or coated with silicone oil, or both fluorinated and coated with silicone oil.

In embodiments of the present disclosure, a distance R between an edge of the first substrate and an edge of the second substrate corresponding to the edge of the first substrate is less than or equal to 20 mm.

In embodiments of the present disclosure, a width of the first adhesive layer is equal to that of the first substrate, and a length of the first adhesive layer is equal to that of the first substrate; or a width of the second adhesive layer is equal to that of the second substrate, and a length of the second adhesive layer is equal to that of the second substrate; or the width of the first adhesive layer is equal to that of the first substrate, the length of the first adhesive layer is equal to that of the first substrate, and the width of the second adhesive layer is equal to that of the second substrate, the length of the second adhesive layer is equal to that of the second substrate.

In embodiments of the present disclosure, the gummed paper further includes a plurality of foaming agent particles distributed in the first adhesive layer, and when the gummed paper is subjected to heat, the plurality of foaming agent particles are foamed, and the two edges of the first substrate in the width direction are curled towards a middle part of the first substrate such that two edges of the first adhesive layer in the width direction are peeled off an object.

In embodiments of the present disclosure, the gummed paper further includes a notch disposed in the width direction of the second substrate, the notch cuts through the first substrate and cuts into the first adhesive layer in the thickness direction, and a depth of the notch is less than or equal to a total thickness of the first substrate and the first adhesive layer.

In embodiments of the present disclosure, the notch disposed in the width direction of the second substrate cuts through the second substrate and cuts into the second adhesive layer, the first substrate and the first adhesive layer, and the depth of the notch is less than or equal to a total thickness of the second substrate, the second adhesive layer, the first substrate and the first adhesive layer.

BRIEF DESCRIPTION OF THE DRAWINGS

The accompanying drawings, which are incorporated in and constitute a part of this specification, illustrate embodiments, features, and aspects of the present disclosure together with the description, and which is used to explain the principles of the present disclosure.

REFERENCE NUMERALS

1: gummed paper; 11: first adhesive layer; 12: first substrate;
13: second adhesive layer; 14: second substrate; 15: notch; 16: uncovered region;
2: object; 21: reserved region; 3: material layer;
L: length direction; W: width direction; T: thickness direction.

DETAILED DESCRIPTION

Explanatory embodiments, features, and aspects of the present disclosure will be described in detail below with reference to the drawings. The same or similar elements and the elements having same or similar functions are denoted by like reference numerals throughout the descriptions and drawings. Though various aspects of the embodiments are shown in the drawings, it is not necessarily to the draw drawings to scale, unless specified otherwise.

The word "exemplary" used herein means that embodiments related thereto are served as examples and are illustrative. Any "exemplary" embodiment described herein is not necessary to be construed to be superior to or better than other examples.

In addition, in order to better explain the present disclosure, numerous specific details are set forth in the following specific embodiments of the present disclosure. It will be appreciated to those skilled in the art that embodiments of the present disclosure can also be implemented without certain specific details. In some embodiments, methods, processes, means, and components that are well known to those skilled in the art are not described in detail, so as to highlight the spirit of the present disclosure.

In the specification, it is to be understood that terms such as "central", "longitudinal", "lateral", "length", "width", "thickness", "upper", "lower", "front", "rear", "left", "right", "inner", "outer", "vertical", "horizontal" and "circumferential" should be construed to refer to the orientation as then described or as shown in the drawings under discussion. These relative terms are only for convenience of description, but do not indicate or imply that the device or element referred to must have a particular orientation, or be constructed or operated in a particular orientation, and thus shall not be construed to limit the present disclosure. In addition, terms such as "first" and "second" are used herein for purposes of description and are not intended to indicate or imply relative importance or significance.

Reference throughout this specification to "an embodiment", "some embodiments", "one embodiment", "another example", "an example", "a specific example", or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example", or "in some examples" in various places throughout this specification are not necessarily referring to the same embodiment or example of the present disclosure. Furthermore, the particular features, structures, materials, or characteristics may be combined in any suitable manner in one or more embodiments or examples.

As illustrated in FIGS. 1 to 12, embodiments of the present disclosure provide a gummed paper 1, including a first substrate 12 and a second substrate 14. In a thickness direction T of the gummed paper, a projection of the second substrate 14 partially covers a projection of the first substrate 12. The first substrate 12 has an uncovered region 16 on an upper surface thereof, a dyne value of an upper surface of the second substrate 14 is greater than or equal to 40 dyn/cm, and a dyne value of the uncovered region 16 is less than the dyne value of the upper surface of the second substrate 14.

Figure 1:
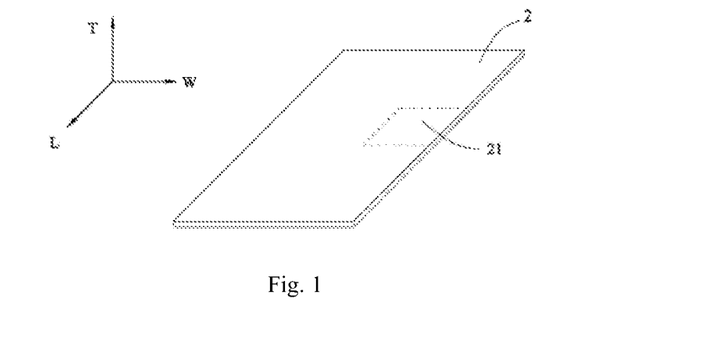
FIG. 1 illustrates a perspective view of an object to which a gummed paper is applied according to an embodiment of the present disclosure.
Figure 2:
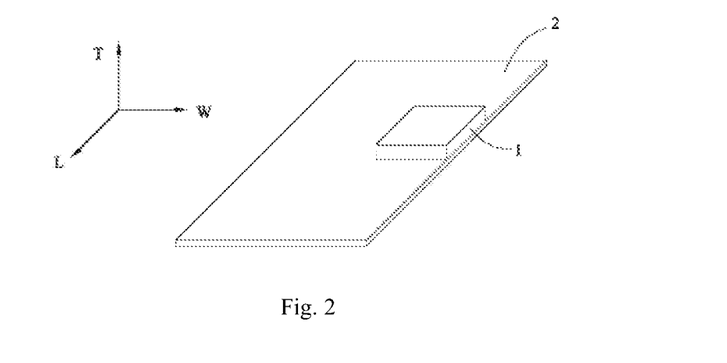
FIG. 2 illustrates a perspective view of the gummed paper adhered to an object according to an embodiment of the present disclosure.
Figure 3:
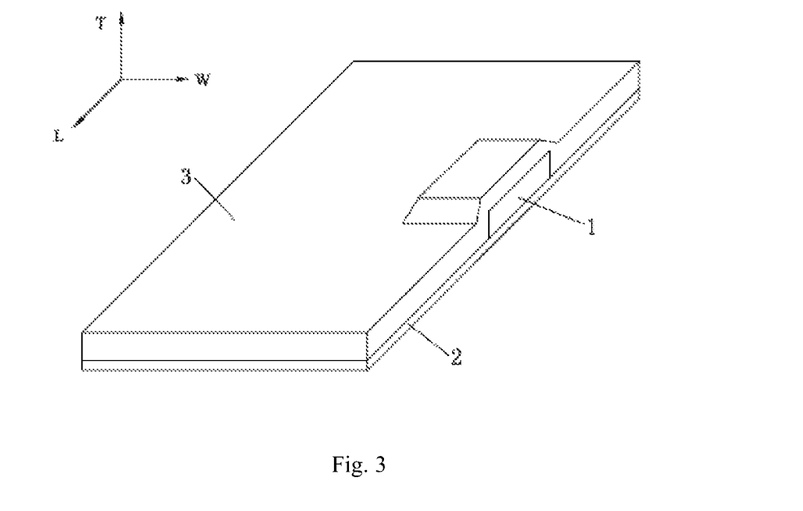
FIG. 3 illustrates a perspective view of the gummed paper coated with a material layer thereon according to an embodiment of the present disclosure.
Figure 4:
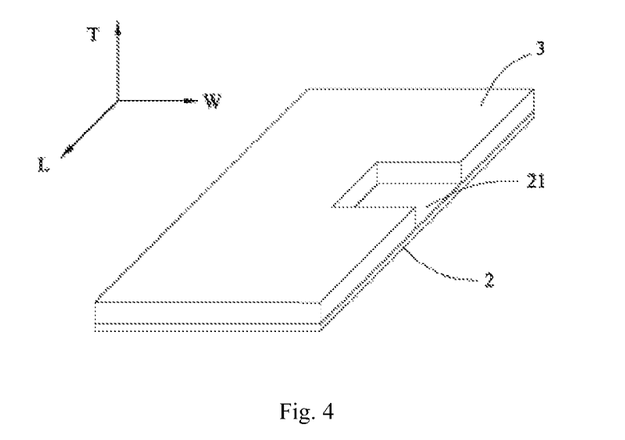
FIG. 4 illustrates a perspective view of the object after the gummed paper is peeled off according to an embodiment of the present disclosure.
Figure 5:
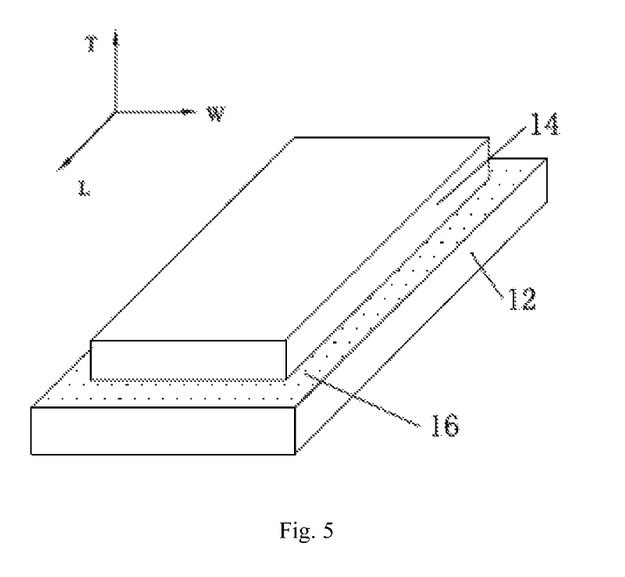
FIG. 5 illustrates a perspective view of the gummed paper according to an embodiment of the present disclosure.
Figure 6:
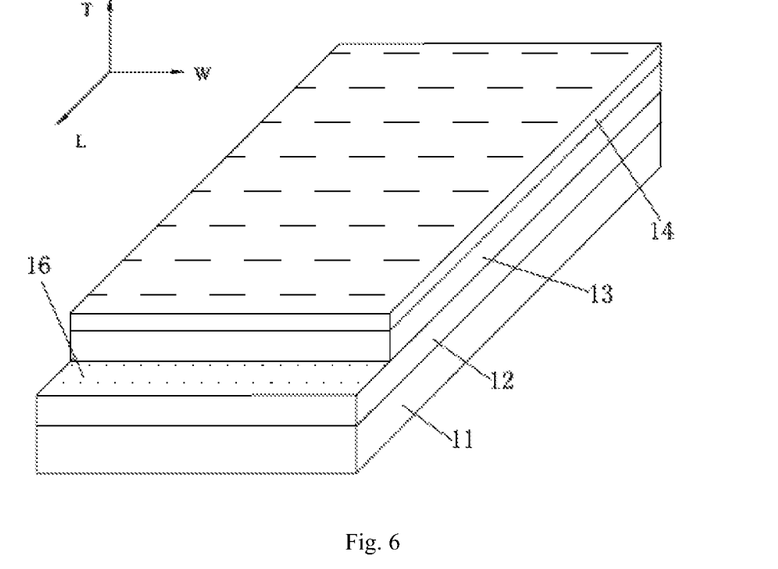
FIG. 6 illustrates a perspective view of a gummed paper according to another embodiment of the present disclosure.

In some embodiments of the present disclosure, as illustrated in FIG. 6, the gummed paper 1 further includes a first adhesive layer 11 and a second adhesive layer 13. The first adhesive layer 11 is adhered to a lower surface of the first substrate 12. The second adhesive layer 13 is located between the first substrate 12 and the second substrate 14, and the adhesive layer 13 is configured to connect the first substrate 12 with the second substrate 14, such that a four-layer structure is formed.

Further, the expression "upper surface of the first substrate 12" used herein refers to a surface of the first substrate 12 adjacent to the second substrate 14. The expression "lower surface of the first substrate 12" used herein refers to a surface of the first substrate 12 away from the second substrate 14 (i.e., the surface opposite to the second substrate 14). The expression "upper surface of the second substrate 14" used herein refers to a surface of the second substrate 14 away from the first substrate 12 (i.e., the surface opposite to the first substrate 12).

As illustrated in FIGS. 1 to 12, in some embodiments of the present disclosure, the gummed paper 1 includes the first adhesive layer 11, the first substrate 12, the second adhesive layer 13, and the second substrate 14. The first adhesive layer 11 is configured to adhere to an object 2, and the lower surface of the first substrate 12 is adhered to a surface of the first adhesive layer 11 opposite to the object 2. The second adhesive layer 13 is adhered to the upper surface of the first substrate 12, and the lower surface of the second substrate 14 is adhered to a surface of the second adhesive layer 13 opposite to the first substrate 12.

As illustrated in FIG. 6, in a same direction, at least one edge of the second substrate 14 and the second adhesive layer 13 at a same side is within an edge of the first substrate 12 corresponding to the at least one edge of the second substrate 14 and the second adhesive layer 13, such that the first substrate 12 has the uncovered region 16 on the upper surface thereof. Moreover, the dyne value of the upper surface of the second substrate 14 is greater than or equal to 40 dyn/cm, and the dyne value of the uncovered region 16 is less than the dyne value of the upper surface of the second substrate 14.

The gummed paper according to the present disclosure has a simple structure, and after slurry is coated on and around the gummed paper, peeling off the gummed paper will not cause the occurrence of warpage around the gummed paper, can obtain a smooth periphery.

In the present disclosure, the term "dyne value" is an indicator of surface energy. In general, a system has a surface tension σ on a surface thereof, and the reversible increase of a surface area of the system by $d_A$ requires work $σd_A$ under constant temperature and constant pressure. As the required work $σd_A$ is equal to the increase of free energy of the system, and the increase of the free energy of the system is caused by the increase of the surface area, so it is called surface free energy or surface energy. It can also be understood that, as bond energy of an outward chemical bond of an atom at a superficial layer is not compensated, mass points at the superficial layer have extra potential energy than internal mass points, which extra potential energy is called surface energy.

In embodiments of the present disclosure, after the gummed paper 1 and the object 2 are coated with slurry, as the dyne value of the uncovered region 16 is less than the dyne value of the upper surface of the second substrate 14, the uncovered region 16 has a low surface energy, while the upper surface of the second substrate 14 has a high surface energy, the slurry above the uncovered region 16 and at an outer edge of the uncovered region 16 moves slowly towards the upper surface of the second substrate 14 under an action of the surface tension of the upper surface of the second substrate 14. At the same time, if drying the gummed paper 1 and the object 2 after the slurry is coated thereon, when a residual solvent in the slurry reaches a certain amount, the slurry above the uncovered region 16 and at the outer edge of the uncovered region 16 will not move towards the upper surface of the second substrate 14 anymore. At this moment, the slurry around the gummed paper 1 has migrated to the upper surface of the second substrate 14, and thus warpage will not occur around the gummed paper 1.

In the present disclosure, "in a same direction" used herein refers to a same width direction or a same length direction.

Figure 9:
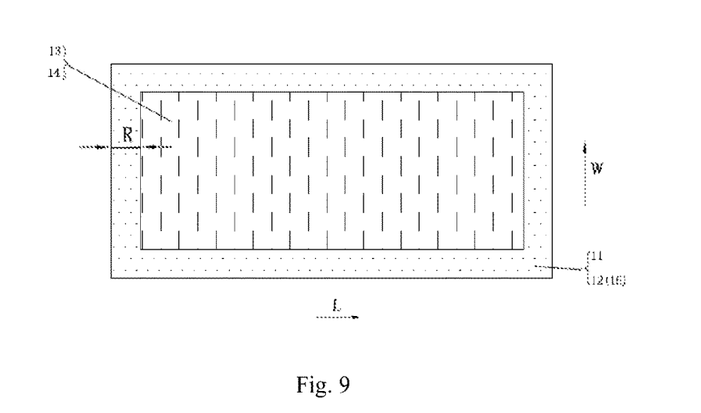
FIG. 9 illustrates a top view of the gummed paper according to another embodiment of the present disclosure.
Figure 10:
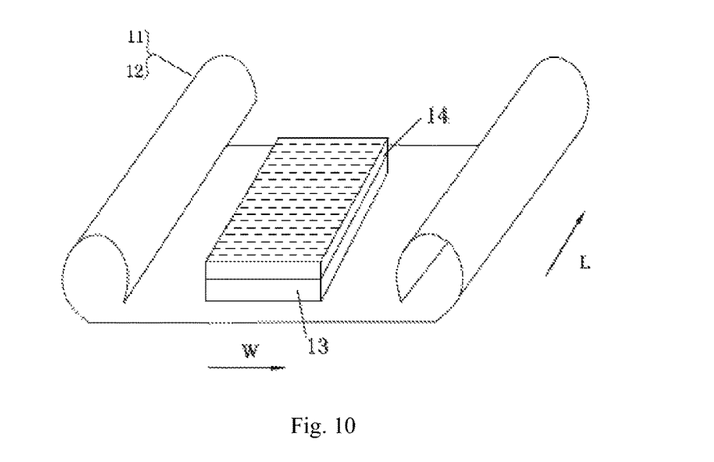
FIG. 10 illustrates a perspective view of a gummed paper according to an embodiment of the present disclosure, where the gummed paper is curled after subjected to heat.

In some embodiments of the present disclosure, the gummed paper 1 further includes a plurality of foaming agent particles distributed in the first adhesive layer 11. As illustrated in FIG. 9, when the gummed paper 1 is subjected to heat, the plurality of foaming agent particles are foamed, two opposite edges of the first substrate 12 in the width direction are curled towards a middle part of the first substrate 12, thereby effectively controlling a curling direction of the gummed paper 1, such that the two edges of the first adhesive layer 11 in the width direction W of the gummed paper 1 are partially peeled off the object 2. At a later stage of drying, the temperature may be raised appropriately to promote the foaming of the plurality of foaming agent particles in the first adhesive layer 11, such that the first adhesive layer 11 is peeled off from the object 2, without occurrence of warpage at the edge where the peeling occurs, i.e., an edge of a reserved region 21 is flat and smooth, thereby avoiding a belt-broken phenomenon in a subsequent rolling process. In general, the second adhesive layer 13 does not generally contain the foaming agent particles therein.

Referring to FIGS. 1 to 4 and in combination with FIGS. 5 to 12, before a material layer 3 is coated onto the object 2, the first adhesive layer 11 is adhered to the object 2 to form a reserved region 21. The material layer 3 is dried after coated on the object 2. In this case, the gummed paper 1 is subject to heat, the plurality of foaming agent particles are foamed, such that the two opposite edges of the first substrate 12 in the width direction W of the gummed paper 1 are curled towards the middle part of the first substrate 12. The two edges of the first adhesive layer 11 corresponding to the two curled edges of the first substrate 12 are detached from the object 2 and jack up the material layer 3 at a periphery of the reserved region 21 at the same time. After the gummed paper 1 is dried and peeled off, the reserved region 21 is formed.

In some embodiments of the present disclosure, in the width direction W of the gummed paper 1, an edge of the second substrate 14 is within an edge of the first substrate 12 corresponding to the edge of the second substrate 14, and an edge of the second adhesive layer 13 is within an edge of the first substrate 12 corresponding to the edge of the second adhesive layer 13. Moreover, in a length direction L of the gummed paper 1, at least one edge of the second substrate 14 and the second adhesive layer 13 at a same side is within an edge of the first substrate 12 corresponding to the at least one edge of the second substrate 14 and the second adhesive layer 13.

In some embodiments of the present disclosure, four edges of the second substrate 14 are within the edges of the first substrate 12 corresponding to the four edges of the second substrate 14, and four edges of the second adhesive layer 13 are within the edges of the first substrate 12 corresponding to the four edges of the second adhesive layer 13.

Figure 7:
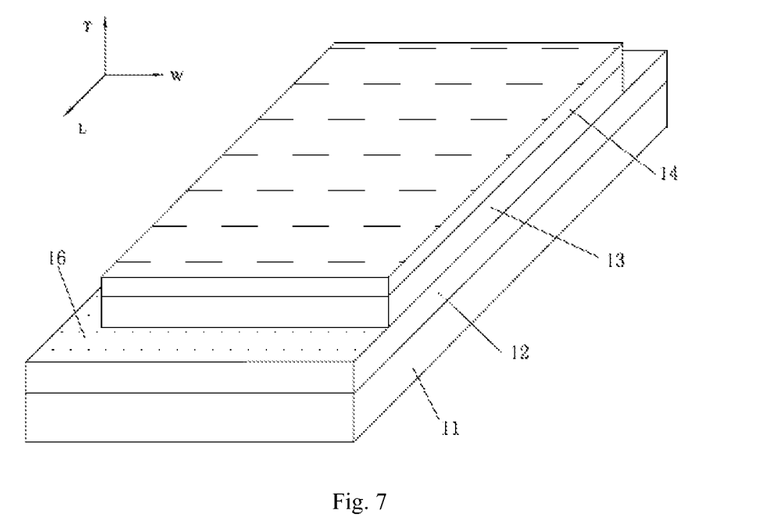
FIG. 7 illustrates a perspective view of a gummed paper according to another embodiment of the present disclosure.
Figure 8:
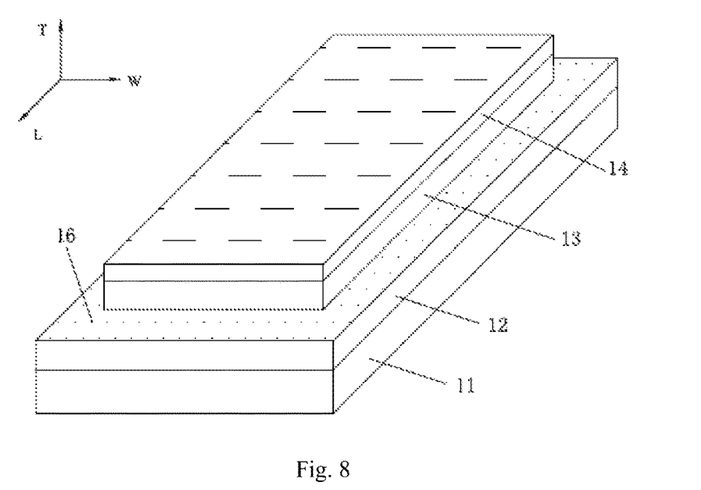
FIG. 8 illustrates a perspective view of a gummed paper according to another embodiment of the present disclosure.

In general, the uncovered region 16 of the gummed paper 1 may be disposed depending on warpage circumstances. For example, as illustrated in FIG. 6, in a case that the warpage will occur only at one edge of the gummed paper 1, the uncovered region 16 is disposed only at this edge. For another example, as illustrated in FIG. 7, in a case that the warpage will occur at four edges of the gummed paper 1, the uncovered region 16 may be disposed at two edges in the width direction W and at least one edge in the length direction L of the gummed paper 1. Alternatively, as illustrated in FIG. 8, the uncovered region 16 may be disposed at the four edges of the gummed paper 1.

In some embodiments of the present disclosure, the dyne value of the uncovered region 16 of the upper surface of the first substrate 12 is less than 40 dyn/cm. In some embodiments of the present disclosure, the uncovered region 16 of the upper surface of the first substrate 12 is fluorinated, or coated with silicone oil, or both fluorinated and coated with silicone oil, such that the dyne value of the uncovered region 16 is less than 40 dyn/cm.

The fluorinated surface may be obtained by a fluorinating treatment, i.e., grafting a non-polar functional group, like a fluoro-group or a fluorocarbon group to the surface so as to lower the dyne value (i.e. the surface energy) thereof. Specifically, using fluorine-containing plasma gas, the fluorinating treatment may be performed to a surface of the uncovered region 16, or directly to the whole surface of the first substrate 12. The fluorine-containing plasma gas may be $CF_4$ or a mixture of $CF_4$ and $CH_4$.

The silicone oil coated surface may be obtained by coating the uncovered region 16 with an organic silicone oil, so as to lower the dyne value (i.e. the surface energy). As the molecular chain of the organic silicone oil is flexible, the intermolecular force is small, the silicon-oxygen bond is easily rotated. Oxygen atoms in the skeleton of the molecular chain are adhered to the surface of the uncovered region 16 of the gummed paper 1 by an intermolecular force, such that a group, like a methyl group, in the organic silicone oil is oriented and arranged regularly on the surface of the uncovered region 16 of the gummed paper 1. Since the group, like the methyl group, in the organic silicone oil has low electron attractiveness, a surface with a low dyne value (surface energy) can be obtained, and the orientation can be maintained stably in a temperature ranging from −40° C. to 250° C., thereby achieving a stable isolation effect.

In some embodiments of the present disclosure, the organic silicone oil may include at least one selected from a group of polydimethylsiloxane, dimethylcyclosiloxane, aminosiloxane, polymethylphenylsiloxane, or a combination thereof. In some embodiments of the present disclosure, a coating thickness of the organic silicone oil may be between 0.1 μm and 2 μm, and in some embodiments, the coating thickness of the organic silicone oil is between 0.2 μm and 1 μm.

In some embodiments of the present disclosure, the upper surface of the second substrate 14 may be subjected to a corona treatment, which is an electric shock treatment and allows the upper surface of the second substrate 14 to have a higher adhesion, thereby enhancing the dyne value (surface energy) of the upper surface of the second substrate 14.

In some embodiments of the present disclosure, depending on specific situations, the uncovered region 16, or the upper surface of the second substrate 14, or both the uncovered region 16 and the surface of the second substrate 14 may be subjected to a surface treatment, so that the dyne value of the uncovered region 16 is less than that of the upper surface of the second substrate 14.

In some embodiments of the present disclosure, the first adhesive layer 11 may include an acrylate adhesive.

In some embodiments of the present disclosure, the first substrate 12 may include at least one selected from a group of aluminum foil, copper foil, tin foil, nickel foil, silver foil, plastic optical fiber, polyvinyl chloride, polypropylene, polyimide, or a combination thereof.

In some embodiments of the present disclosure, the second adhesive layer 13 may include an acrylate adhesive.

In some embodiments of the present disclosure, the second substrate 14 may include at least one selected from a group of polyester resin, plastic optical fiber, polyvinyl chloride, polypropylene, polyimide, or a combination thereof.

In some embodiments of the present disclosure, the foaming agent may be a physical foaming agent or a chemical foaming agent. The physical foaming agent may be selected from long-chain alkane foaming agents, including an iso-pentane foaming agent, an iso-butane foaming agent, etc. The chemical foaming agent may be selected from a group of azodicarbonamide (AC), azodiisobutyronitrile (AIBN), N,N'-dinitroso-pentamethylenetetramine (DPT), 4,4'-oxybisbenzenesulfonic hydrazine (OBSH), or p-toluene-sulfonyl hydrazine (TSH), etc.

Further, in the first adhesive layer 11, a curing agent may be added. In some embodiments of the present disclosure, the curing agent may be selected from a group of aliphatic polyamines, alicyclic polyamine, low molecular polyamide, modified arylamine, or isocyanate, etc.

In some embodiments of the present disclosure, a distance R between an edge of the first substrate 12 and an edge of the second substrate 14 corresponding to the edge of the first substrate 12 is less than or equal to 20 mm, and in some embodiments, the distance R is between 0.1 mm and 10 mm.

In some embodiments of the present disclosure, a width of the first adhesive layer 11 is equal to that of the first substrate 12, and a length of the first adhesive layer 11 is equal to that of the first substrate 12. Alternatively, in some embodiments, a width of the second adhesive layer 13 is equal to that of the second substrate 14, and a length of the second adhesive layer 13 is equal to that of the second substrate 141. Alternatively, in some embodiments, the width of the first adhesive layer 11 is equal to that of the first substrate 12, the length of the first adhesive layer 11 is equal to that of the first substrate 12, and the width of the second adhesive layer 13 is equal to that of the second substrate 14, the length of the second adhesive layer 13 is equal to that of the second substrate 14. In this way, it is convenient for die cutting, and it is easy to prepare the gummed paper 1.

In some embodiments of the present disclosure, the first adhesive layer 11 has a thickness ranging from 10 μm to 40 μm, the first substrate 12 has a thickness ranging from 2 μm to 20 μm, the second adhesive layer 13 has a thickness ranging from 10 μm to 40 μm, and the second substrate 14 has a thickness ranging from 2 μm to 20 μm.

Figure 11:
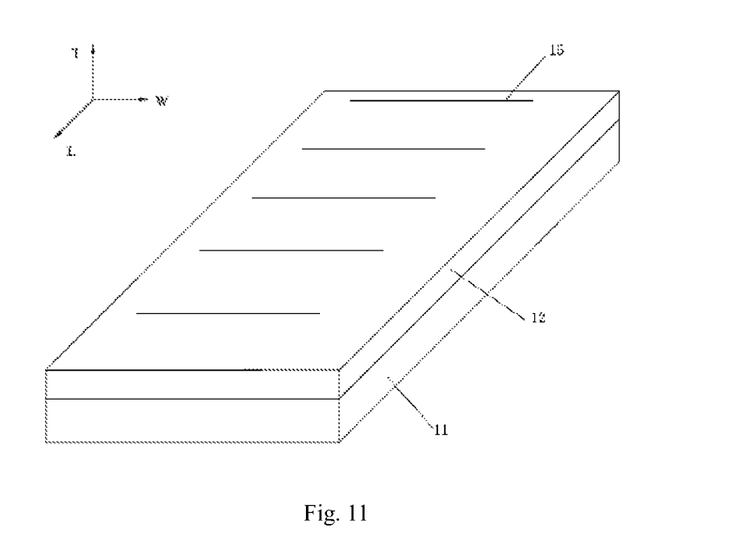
FIG. 11 illustrates a schematic diagram of a first adhesive layer and a first substrate of the gummed paper according to an embodiment of the present disclosure.

In some embodiments of the present disclosure, as illustrated in FIG. 11, the gummed paper 1 further includes a notch disposed 15 in the width direction W of the second substrate, the notch 15 cuts through the first substrate 12 and cuts into the first adhesive layer 11 in the thickness direction T, and a depth of the notch 15 is less than or equal to a total thickness of the first substrate 12 and the first adhesive layer 11.

In the present disclosure, the notch 15 may be in an S-shape, an L-shape, an I-shape or an X-shape, which will not be specifically limited herein. Further, in some embodiments of the present disclosure, a shortest distance of between two end points of the notch 15 in the width direction W is less than the width of the gummed paper 1.

Figure 12:
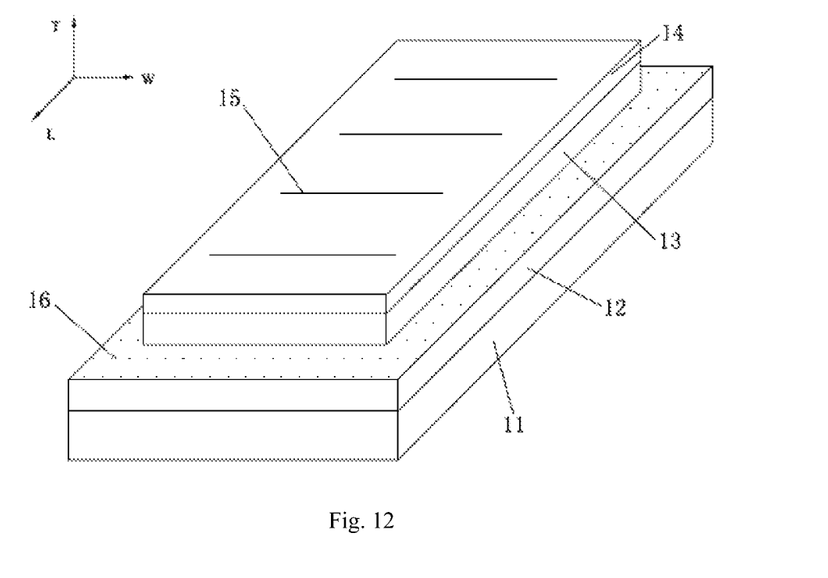
FIG. 12 illustrates a perspective view of the gummed paper according to another embodiment of the present disclosure.

Further, in embodiments of the present disclosure, as illustrated in FIG. 12, the notch 15 disposed in the width direction W of the second substrate cuts through the second substrate 14 and cuts into the second adhesive layer 13, the first substrate 12 and the first adhesive layer 11 in the thickness direction T, and the depth of the notch 15 is less than or equal to a total thickness of the second substrate 14, the second adhesive layer 13, the first substrate 12 and the first adhesive layer 11. Also, in some embodiments of the present disclosure, the shortest distance of between two end points of the notch 15 in the width direction W is less than the width of the gummed paper 1.

According to embodiments of the present disclosure, after the plurality of foaming agent particles in the first adhesive layer 11 are foamed, two opposite edges of the gummed paper 1 in the width direction W are curled towards a middle part thereof, and without the occurrence of warpage at the edge where the peeling occurs, thereby effectively solving the problem that the warpage occurs at the periphery of the reserved region 21, and avoiding the belt-broken phenomenon in the subsequent rolling process.

Although explanatory embodiments have been shown and described above, it would be appreciated by those skilled in the art that the above embodiments cannot be construed to limit the present disclosure, and changes, alternatives, and modifications can be made in the embodiments without departing from spirit, principles and scope of the present disclosure. Therefore, the protection scope of the present disclosure shall be based on the protection scope of the appended claims.

What is claimed is:

1. A gummed paper, comprising:
   a first substrate, having an uncovered region on an upper surface thereof;
   a second substrate; and
   a second adhesive layer, located between the first substrate and the second substrate, and configured to adhere the first substrate to the second substrate,
   wherein in a thickness direction of the gummed paper, a projection of the second substrate partially covers a projection of the first substrate, a projection of the second adhesive layer is within the projection of the second substrate and outside the uncovered region of the upper surface of the first substrate, a second dyne value of an upper surface of the second substrate is greater than or equal to 40 dyn/cm, and a first dyne value of the uncovered region of the upper surface of the first substrate is less than 40 dyn/cm, the gummed paper further comprising a plurality of foaming agent particles distributed in a first adhesive layer adhered to a lower surface of the first substrate, and the gummed paper is configured to receive a coating material on both the upper surface of the second substrate and the uncovered region of the upper surface of the first substrate, and a difference of between the second dyne value of the upper surface of the second substrate and the first dyne value of the uncovered region of the upper surface of the first substrate causes a movement of the coating material on the uncovered region of the upper surface of the first substrate towards the upper surface of the second substrate, when the gummed paper is subjected to heat, the plurality of foaming agent particles are foamed, two edges of the first substrate in a width direction of the gummed paper are curled towards a middle part of the first substrate such that the two edges of the first adhesive layer in the width direction are peeled off an object to leave a void in the coating material that has flat and smooth edges because of the movement of the coating material from the uncovered region of the upper surface of the first substrate towards the upper surface of the second substrate, and the two edges of the first adhesive layer is configured to jack up the coating material at a periphery of the void.

2. The gummed paper according to claim 1, wherein in the width direction of the gummed paper, an edge of the second substrate is within an edge of the first substrate corresponding to the edge of the second substrate, an edge of the second adhesive layer is within an edge of the second substrate corresponding to the edge of the second adhesive layer; and in a length direction of the gummed paper, an edge of at least one side of the second substrate is within an edge of the first substrate corresponding to the edge of at least one side of the second substrate, an edge of at least one side of the second adhesive layer is within an edge of the second substrate corresponding to the edge of at least one side of the second adhesive layer.

3. The gummed paper according to claim 1, wherein the uncovered region of the upper surface of the first substrate is fluorinated, or coated with silicone oil, or both fluorinated and coated with silicone oil.

4. The gummed paper according to claim 1, wherein a distance R between an edge of the first substrate and an edge of the second substrate corresponding to the edge of the first substrate is less than or equal to 20 mm.

5. The gummed paper according to claim 1, wherein a width of the first adhesive layer is equal to that of the first substrate, and a length of the first adhesive layer is equal to that of the first substrate; or a width of the second adhesive layer is equal to that of the second substrate, and a length of the second adhesive layer is equal to that of the second substrate; or the width of the first adhesive layer is equal to that of the first substrate, the length of the first adhesive layer is equal to that of the first substrate, and the width of the second adhesive layer is equal to that of the second substrate, the length of the second adhesive layer is equal to that of the second substrate.

6. The gummed paper according to claim 1, further comprising a notch disposed in the width direction of the second substrate, wherein the notch cuts through the first substrate and cuts into the first adhesive layer in the thickness direction, and a depth of the notch is less than or equal to a total thickness of the first substrate and the first adhesive layer.

7. The gummed paper according to claim 6, wherein the notch in the width direction cuts through the second substrate and cuts into the second adhesive layer, the first substrate and the first adhesive layer, and the depth of the notch is less than or equal to a total thickness of the second substrate, the second adhesive layer, the first substrate and the first adhesive layer.

8. The gummed paper according to claim 2, wherein a width of the first adhesive layer is equal to that of the first substrate, and a length of the first adhesive layer is equal to that of the first substrate; or a width of the second adhesive layer is equal to that of the second substrate, and a length of the second adhesive layer is equal to that of the second substrate; or the width of the first adhesive layer is equal to that of the first substrate, the length of the first adhesive layer is equal to that of the first substrate, and the width of the second adhesive layer is equal to that of the second substrate, the length of the second adhesive layer is equal to that of the second substrate.

9. The gummed paper according to claim 2, further comprising a notch disposed in the width direction of the second substrate, wherein the notch cuts through the first substrate and cuts into the first adhesive layer in the thickness direction, and a depth of the notch is less than or equal to a total thickness of the first substrate and the first adhesive layer.

10. The gummed paper according to claim 9, wherein the notch disposed in the width direction of the second substrate cuts through the second substrate and cuts into the second adhesive layer, the first substrate and the first adhesive layer, and the depth of the notch is less than or equal to a total thickness of the second substrate, the second adhesive layer, the first substrate and the first adhesive layer.

11. The gummed paper according to claim 1, wherein four edges of the second substrate are within edges of the first substrate corresponding to the four edges of the second substrate, and four edges of the second adhesive layer are within edges of the second substrate corresponding to the four edges of the second adhesive layer.

12. The gummed paper according to claim 1, wherein the upper surface of the second substrate is subjected to a corona treatment.

13. The gummed paper according to claim 1, wherein the first adhesive layer has a thickness ranging from 10 μm to 40 μm, the first substrate has a thickness ranging from 2 μm to 20 μm, the second adhesive layer has a thickness ranging from 10 μm to 40 μm, and the second substrate has a thickness ranging from 2 μm to 20 μm.

14. The gummed paper according to claim 1, wherein the first substrate comprises at least one selected from a group of aluminum foil, copper foil, tin foil, nickel foil, silver foil, plastic optical fiber, polyvinyl chloride, polypropylene, polyimide, or a combination thereof.

15. The gummed paper according to claim 1, wherein the second substrate comprises at least one selected from a group of polyester resin, plastic optical fiber, polyvinyl chloride, polypropylene, polyimide, or a combination thereof.

16. The gummed paper according to claim 1, wherein at least one of the first adhesive layer and the second adhesive layer comprises an acrylate adhesive.

* * * * *